VIDEO RECORDING SYSTEM WITH SYNCHRONIZED FILM AND DISK RECORDS

Filed Nov. 19, 1963 3 Sheets-Sheet 1

INVENTOR
Hugh F. Frohbach
By Smyth, Roston & Pavitt
Attorney.

Jan. 30, 1968 H. F. FROHBACH 3,366,733

VIDEO RECORDING SYSTEM WITH SYNCHRONIZED FILM AND DISK RECORDS

Filed Nov. 19, 1963 3 Sheets-Sheet 2

INVENTOR
Hugh F. Frohbach
By Smyth, Roston & Pavitt
Attorneys

Jan. 30, 1968 H. F. FROHBACH 3,366,733

VIDEO RECORDING SYSTEM WITH SYNCHRONIZED FILM AND DISK RECORDS

Filed Nov. 19, 1963 3 Sheets-Sheet 3

INVENTOR:
Hugh F. Frohbach
By Smyth, Roston & Pavitt
Attorneys 3,366,733

VIDEO RECORDING SYSTEM WITH SYNCHRONIZED FILM AND DISK RECORDS

Hugh F. Frohbach, Sunnyvale, Calif., assignor to Minnesota Mining and Manufacturing Company, St. Paul, Minn., a corporation of Delaware Filed Nov. 19, 1963, Ser. No. 324,734
13 Claims. (Cl. 178—6.7)

ABSTRACT OF THE DISCLOSURE

A system for recording video signals derived from a motion picture film on a disk is disclosed. The motion picture advance is controlled in synchronism with the rotation of the disk whereby, for example, succeeding film pictures are recorded alternatingly as two and three fields for 24 frames per second type film, or three film pictures are recorded in four fields, one film picture in three fields, in alternating sequence for a 16 frames per second type film. General rules are developed for the various cases. The recording of sequential fields is controlled in synchronism with the rotation of the disk, and the alternating recording patterns are counted out.

The present invention relates to a system for obtaining a recording of information such as video signals on a storage disk by transfer of such video signals, after scanning thereof, from a film to such a disk.

In recent years, systems have been constructed for recording high-frequency information on a storage medium for purposes of subsequent reproduction of such recorded information. For example, information has been recorded on a magnetic tape where the information constitutes video and audio signals having characteristics which, respectively, represent at each instant an image being viewed and the sound emanating from the environment of the image. Signals are also recorded on storage media in representation of different scientific and mathematical information, including the reading of instruments and the values obtained from computations performed by digital computers.

For the recording of high-frequency information, the systems now in use generally employ magnetic tapes as the storage medium. These tapes have, in general, proved fairly satisfactory in recording signals representative of information and in obtaining the reproduction of the information. However, the fidelity of the recording and reproduction is dependent upon the magnetic structure of the tape so that the magnetic tapes have to be manufactured with considerable precision. However, the information recorded on the magnetic tapes has a limited density of information packing, so that a relatively great amount of tape is required to store the information represented, for example, by a television program having a duration of approximately a half hour. The limited density of information packing on the tape has resulted from limitations in the speed of response of the magnetic transducer heads which are disposed in contiguous relationship to the tape. It has also resulted from limitations in the frequency at which information can be transferred between the magnetic transducer heads and the magnetic layers on the tape.

The systems now in use generally dispose the transducing head adjacent to the tape to record information in magnetic form on the tape and to reproduce such magnetic information as electrical signals from the tape. The adjacent relationship between the transducing head and the tape causes the tape to rub occasionally against the head so that magnetic particles become removed from the tape and are deposited on the head to affect the operation of the head. The magnetic particles removed from the tape also tend to produce an abrasive action on the head so that the response characteristics of the head become permanently affected.

Systems using disks as the master would probably be more desirable than tapes, since they tend to store information in a more compact form than tapes. However, the disk systems of the prior art have generally involved a groove cut in a disk of plastic material, with variations in the walls of the groove representing the electrical information.

The prior art disk systems have had certain important deficiencies. For example, the reproducing means has generally engaged the disk. For example, the reproducing means has constituted a needle which has contacted a groove in the disk to reproduce the information on the disk. This contact between the needle and the groove has tended to wear the disk after the disk has been used several times. It has also tended to wear the needle so as to reduce the subsequent fidelity of reproduction from the disk.

One type of information that is of particular interest to be recorded comprises the pictures taken on a regular film by means of a movie camera. In order to adapt the video information content on a film, a line-by-line scanning of each individual picture is necessary, and a recording to be used for television reproduction of such film should have the video information stored in a contiguous recording track. If the record is a disk, such a track preferably forms a spiral thereon, whereby the track includes as stored information appropriate synchronization and blanking signals so that, upon reproduction, the recording disk furnishes all of the signals that are required for complete television operation.

One of the problems of transferring film pictures into recorded and reproducible television frames is to be seen in the fact that movies are commonly taken at a picture rate that is different from the TV frame rate. Ordinarily, movie cameras are operated at a rate of twenty-four pictures per second. while the standard TV rate is thirty frames per second. Usually the interlaced scanning method is being used with two interlaced fields per frame, so that there is present a rate of sixty fields per second. Since the recording disk is to be played back directly by a TV set, the information must be recorded to accommodate the conventional frame and field rates.

It is an object of the present invention to record on a storage medium such as a disk a reproducible TV video signal, by way of transferring the video information from a film to the disk, which film has been taken at a picture rate per second different from the TV frame rate to be recorded.

According to one aspect of the present invention in the preferred embodiment thereof, it shall be assumed that the content of film pictures be recorded along a spiral track on a rotating information storage carrier whereby $m$ film pictures are to be recorded in $n$ fields along such a spiral track, with $m$ and $n$ being integers having no common denominator. It is a first feature of the invention to provide a train of distinct synchronizing or clock pulses ultimately determining the spacing in between successively recorded fields. There are next provided counting means for counting two different numbers of such synchronization pulses, with the two different numbers that are being counted preferably differing by unity. Counting of the two numbers is done either alternatingly, or with the counting of one fixed number of sync pulses being followed by the counting of twice or more of the other number of sync pulses. There are next provided film-transporting or advancing means for successively placing the individual film pictures into the range of a field scanner as constituted by a flying spot, focusing means, and a photoelectric detector network. The film advancing is controlled by the counting means, and whenever one of the fixed numbers has been counted, the film is being advanced to place the next picture in said scanning range. The photoelectric detector network mentioned above controls and governs the inscribing of a recording track on the rotating storage carrier disk.

The principle underlying the invention will be understood best from the consideration of the following equations. As was said above, $m$ film pictures are to be recorded in $n$ interlaced fields whereby some of the $m$ pictures will be recorded in $p$ fields, while the remaining pictures will be recorded in $p+1$ fields. If $x$ is the number of film pictures that are being reproduced in $p$ fields each, and if $y$ is the number of film pictures that are being reproduced in $p+1$ fields each, the following two equations are true:

$$n=x\cdot p+y\cdot(p+1)$$
$$m=x+y$$

The complete reproduction of $m$ film pictures in $n$ fields shall constitute one reproduction cycle. Since one can consider the shortest cycle of a reproduction with either $x$ or $y$ being unity, the above equations yield the following two groups of results.

With $y=1$, we have the result of $$p=\frac{n-1}{m}$$

and $p+1$ accordingly being $$\frac{n-1}{m}+1$$

This result can be interpreted as follows. One film picture will be reproduced by $$\frac{n-1}{m}+1$$

fields, while $m-1$ film pictures will be reproduced in $$\frac{n-1}{m}$$

fields each. In order to give a numerical example, it shall be assumed that a film which has been taken at a rate of twenty-four pictures per second is to be reproduced for conventional TV reproduction in sixty frames per second. This means that five fields are to receive the content of two film pictures. Thus, $n=5$ and $m=2$. If one introduces these numbers into the above equations, it appears that one of the two film pictures will appear in three frames, and one film picture will appear in two frames. Accordingly, for purposes of transferring the film media content into a TV video signal, it is necessary to control the transfer process in such a manner that alternatingly the film pictures are reproduced in two and in three fields.

In the above equations, one can also assume that $x=1$, in which case one film picture is reproduced in $$\frac{n+1}{m}-1$$

fields, while $m-1$ film pictures are being reproduced in $$\frac{n+1}{m}$$

fields. Since, in the above-given numerical example, $x$ as well as $y$ is unity, the latter two formulas yield the same result.

Whether one uses $x=1$ or $y=1$ depends on the decimal fraction in the ratio $n/m$. If the decimal fraction is $>0.5$, one will use $x=1$. If the decimal fraction is $<0.5$, one will use $y=1$. If the decimal fraction equals 0.5, one can use $x=1$ or $y=1$.

While the specification concludes with claims particularly pointing out the present invention, it is believed that the invention, the advantages and objects of the invention, and additional features thereof will be understood best from the description of the appended drawings, in which:

FIG. 1 illustrates schematically a block diagram of a first and preferred embodiment of the invention;

FIG. 1*a* illustrates in perspective view an enlarged portion of a recording disk and supporting turntable;

FIG. 1*b* is a pulse diagram showing several pulses as they appear within the network shown in FIG. 1;

Figures 1, 1A, 1B:
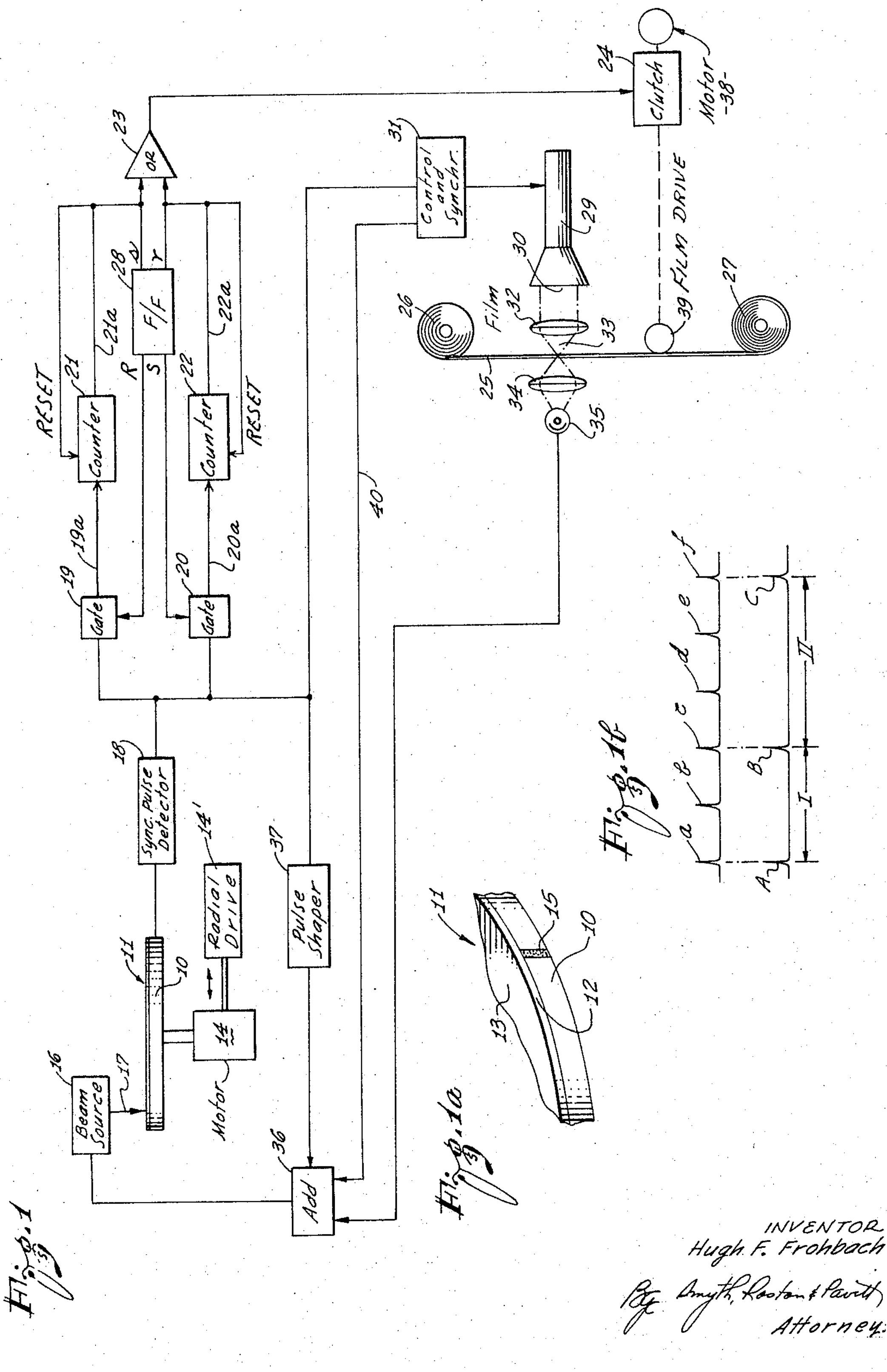

Proceeding now to the detailed description of the drawings, in FIG. 1 thereof there is shown a turntable 10 supporting a disk 11 upon which a recording is to be produced. The recording disk 11 may comprise a backing member 12 upon which is deposited a photographic layer 13 of any conventional type (see FIG. 1*a*). The turntable 10 is driven by a motor 14, preferably at a constant speed. The turntable 10 further carries on its circumference a reference marker 15, which marker may, for example, consist of a contrast-producing line which is either brighter or darker in comparison with the remainder of the circumference of turntable 10.

Above the recording disk 11 there is disposed a source of energy 16 directing and focusing a radiation beam 17 towards the photographic layer 13. The radiation beam 17 may be a light beam focused upon layer 13, or beam 17 may comprise electrons electrostatically and/or magnetically focused upon layer 13. Alternatively, source 16 may be an electromagnetical transducer head, with the layer 13 consisting of or comprising a magnetizable material. The specific physical process of recording is not of salient importance for practicing the invention; however, an electron beam interacting with a photographic layer constitutes the preferred form. The recording itself along a track is produced by modulating the intensity of beam 17. Conventional elements are employed for this purpose. However, a preferred form of an electron gun usable with advantage for producing a modulated electron beam is shown in copending application of Gregg, Ser. No. 181,393, filed Mar. 21, 1962, and having a common assignee.

During recording, the source of energy 16 will be shifted in a radial direction with respect to turntable 10 or vice versa, for example, by means of a radial drive 14', so that a spiral recording track is being inscribed on photographic layer 13. Devices for producing such a spiral track are, for example, described in greater detail in copending applications of Gregg, Ser. No. 195,218, filed May 16, 1962, and of Johnson et al., Ser. No. 192,-930, filed May 7, 1962.

Radially displaced from turntable 10, there is disposed a stationary detector 18 which is responsive to the passage of reference marker 15 upon rotation of turntable 10. For reasons to be described more fully below, there is one marker 15 on turntable 10 so that detector 18 will produce one output pulse per revolution of the turntable 10. Detector 18 may include a conventional electronic amplifier.

The output of detector 18 is fed to the main or signal input terminals of two gates 19 and 20. A main or signal output terminal **19*a* of gate 19 is connected to a counter 21, whereas the main or signal output terminal 20*a* of gate 20 is connected to a counter 22. Thus, whatever signals are permitted to pass through gate 19 or gate 20 serve as counting signals for counters 21 and 22**, respectively.

Counter 21 is of the count-two type; counter 22 is of the count-three type. Preferably, counter 21 comprises two successively activatable stages, for example, flip-flops, while counter 22 has three such stages. The two counters may have their stages interconnected in a manner known from shift registers.

For each two pulses appearing at the output terminal

19*a*, there will be one pulse appearing at an output terminal 21*a* of counter 21; and after each three pulses at output terminal 20*a* of gate 20, there will appear one output pulse at an output terminal 22*a* of counter 22.

A pulse adder such as a simple OR gate 23 has its two input terminals connected to counter output terminals 21*a* and 22*a*. The counter output terminals 21*a* and 22*a* are, furthermore, connected to two different input terminals of a flip-flop 28, and the counter output signals thus alternatingly place the flip-flop into opposite states. Flip-flop 28 has two output terminals respectively connected to the gating terminals of gates 19 and 20. The connection is made in the following manner. Whenever a pulse appears at counter output terminal 21*a*, flip-flop 28 is placed into a state so as to gate-open gate 20, while simultaneously gate 19 is being blocked. A pulse at output terminal 22*a* places flip-flop 28 into the opposite state, whereby gate 19 is being gated-open and gate 20 is closed.

It will be appreciated that, by way of the illustrated and described interconnection of counters and gates, the counters will alternatingly count the pulses picked up by detector 18, and only one counter at a time is being enabled by the gate connected ahead thereof. Each counter is further provided with a reset network so that each counter output pulse is recycled to reset the respective counter to zero.

The output terminal of OR gate 23 is connected to a servo drive 24 for driving a film 25. Film 25 is being wound from a feed reel 26 and being rewound upon a take-up reel 27. For each pulse appearing at the output terminal of adder 23, the servo drive 24 will advance film 25 at a distance corresponding precisely to the height of one picture or frame.

Servo drive 24 may comprise an electromagnetic coupling or clutch connecting temporarily a continuously running motor 38 to a sprocket wheel 39 for advancing film 25. Sprocket wheel 39 meshes with the perforations of film 25. The duration of the pulse drawn from either counter and passed through OR gate 23 is sufficiently long so as to couple motor 38 to sprocket wheel 39 for precisely the period of time required to advance film 25 by one film picture. This period of time is further determined by the length of the sync signal derived from detector 18 and is to be equal to the vertical sync signal as will be recorder on disk 11.

Adjacent film 25 there is positioned a cathode-ray tube 29 having a fluorescent screen 30, upon which is produced a flying spot in a manner known for the production of TV images on a video screen or on a display screen of a measuring cathode-ray tube. Cathode-ray tube 29 is controlled by a network 31 for scanning and synchronization, which network 31 is connected to detector 18 for receiving its vertical sync pulse therefrom. Network 31 controls the flying light spot so that it runs through an interlaced field, with two successive fields comprising one frame.

The fluorescent screen 30 preferably consists of a material having no afterglow. The light emitted from the spot running across screen 30 is focused by a lens 32 as a scanning light beam 33 upon film 25, so that a particular frame or film picture is being scanned in synchronism with a moving light spot.

The film 25, as positioned in the light path of scanning beam 33, modulates this beam, and the thus modulated light is picked up by a lens 34 imaging the modulated light spot into a photoelectric receiver 35. The photoelectric receiver 35 is connected to an adder 36, the output of which connects to the source of energy 16. The intensity of recording beam 17 will be modulated in accordance with the varying intensity of the light as detected by photoelectric receiver 35, thus providing the camera signal within the video signal to be recorded.

The output of detector 18 is, furthermore, connected to the input side of a pulse shaper 37 having its output connected to a second input terminal of adder 36. Pulse shaper 37 is of such a type that, upon occurrence of any pulse in detector 18, a signal is fed through adder 36 into source 16 capable of modulating the beam of energy 17 in such a manner that the resulting record thereof is capable of serving as a vertical sync signal whenever the recording is being played back in a conventional television receiver.

A connection 40 leads from network 31 to adder 36, providing for a signal to be recorded as a representation of each horizontal sync signal controlling tube 29. Such a horizontal sync signal is also to be recorded on disk 11, particularly in the spiral track inscribed on layer 13.

The device as described thus far operates in a manner to be described as follows, whereby particular reference is made to FIG. 1*b*.

It shall be assumed that gate 20 is open and gate 19 is closed. It shall further be assumed that counter 22 has already counted up to two.

Upon further rotation of turntable 10, marker 15 will pass through the range of detector 18, and a pulse *a* will appear at the output thereof. This pulse *a* is being used in a threefold manner. It is first passed to network 31 to trigger a new scanning field. Secondly, pulse *a* is passed through the still open gate 20, shifting counter 22 into its count-three state. The counter output pulse at terminal 22*a* is passed into OR gate 23 (pulse A) closing clutch 24, and sprocket wheel 39 advances film 25 by one picture. A picture (I) is now placed into the scanning range of beam 33. The counter output pulse at terminal 22*a* further resets counter 22, and finally flip-flop 28 is triggered to block gate 20 and to open gate 19. Thirdly, pulse *a* is passed through pulse shaper 37 and adder 36 to be inscribed as a vertical sync pulse into the record presently produced on disk 11.

After decay of pulse *a*, photoelectric receiver 35 picks up the modulated light beam 33 and produces the camera signal to be inscribed by modulated beam 17 along the spiral track on disk 11.

After one revolution of turntable 10 with disk 11, marker 15 passes again through the detecting range of detector 18, resulting in a pulse *b*. Again, the pulse *b* is used in a threefold manner. It is first passed to the main input terminals of the two gates 19 and 20. Flip-flop 28 is now in such a state that gate 19 is open and gate 20 is blocked. Thus, pulse *b* will pass through gate 19 only and will activate the first stage of counter 21 accordingly.

Pulse *b* is further passed into control network 31, ultimately triggering a run of the flying light spot so that a second interlaced field of still the same picture of film 25 will be scanned; film 25 is not being advanced upon occurrence of pulse *b*. Prior to this scanning operation, however, the pulse *b* was, thirdly, passed through pulse shaper 37, the output of which is used to imprint a recorded vertical sync signal on record disk 11 by means of appropriate modulation of beam 17.

After decay of pulse *b*, the video information picked up by photoelectric receiver 35 is recorded in a spiral track portion on record disk 11, which spiral track portion is contiguous with the first recording track produced in between pulses *a* and *b*.

Upon completion of the recording of the second field, marker 15 passes again through the detector range of detector 18, producing accordingly a pulse *c*.

This pulse *c* again passes through gate 19, since the latter gate is still open. Counter 21 responds to this pulse in that it is shifted into its count-two state. Accordingly, an output pulse B appears at terminal 21*a*, which is used to reset the counter 21 and is passed through OR gate or adder 23 into the film drive such as clutch 24. Clutch 24 is designed to respond instantaneously to this pulse, so that motor 38 and sprocket wheel 39 will rapidly advance film 25 to place the next picture (II) into the scanning range of scanning beam 33. Simultaneously with the advancement of the film 25, pulse *c* is passed into the pulse shaper 37, and again a record for a sync pulse is being inscribed upon recording disk 11. Finally, pulse *c* passes into network 31 so as to initiate another run for the flying spot on screen 30, resulting in a scanning beam 33 appropriately modulated by the picture newly disposed into its range. It will be appreciated that now a third recording track will be inscribed upon recording disk 11, which third recording track is contiguous with the two previously inscribed tracks.

The output pulse B of counter 21 appearing at terminal 21*a* is, furthermore, used to reverse the state of flip-flop 28 so that gate 19 becomes blocked and gate 20 is opened again.

After another revolution of turntable 10, another pulse, *d*, will appear at the output side of detector 18, which pulse *d* is now passed through gate 20 to counter 22, whereby the first stage is activated accordingly. This pulse *d* is also being fed to network 31 and pulse shaper 37 to initiate operations as aforedescribed.

Clutch 24 is not being activated by any of the two output pulses *d* and *e* to be derived from detector 18. The picture (II) presently in the range of scanning beam 33 will be scanned three times in three fields, until counter 22 responds to a detector pulse *f* resulting in a counter output pulse C so as to advance the film 25 again by one frame or picture.

Since the interlaced method is being used, two succeeding track portions inscribed upon record 11 define one frame for a TV picture. Since changes from one film picture to the next are very slight, it is immaterial whether or not the two succeeding fields composing one frame result from one and the same or from two succeeding film pictures.

From the foregoing, it will be appreciated that the system described alternatingly records two fields and three fields for one film picture. For the present system, five such fields complete one recording cycle in that two film pictures (I and II) have been recorded in five fields or two and one-half frames of video signals. On the average, there will be two and one-half fields recorded within the track on record 11 for one film picture. This, in turn, means that a film frame rate of twenty-four results in a TV frame rate of thirty. Since one field is recorded in between two succeeding sync pulses derived from detector 18, each field extends over a track which is almost a complete circle on the recording disk.

It will be understood from the foregoing that the system described thus far operates in such a manner that, for each twenty-four film pictures, there will be recorded sixty fields corresponding to thirty frames on the record disk 11. These numbers of film pictures and TV video frames correspond to each other in relation to the time unit, i.e., a second. In other words, originally a camera took twenty-four film pictures within one second, and the corresponding sixty fields recorded on disk 11 will be reproduced by a TV set later on, also in one second. However, for purposes of transferring the video information from the film onto the record disk 11, it is necessary only that, within the same time unit of transfer, twenty-four film pictures are recorded as sixty fields. It is arbitrary how long a time unit is selected for such a transfer, and such a unit does not have to be one second.

In order to transfer and record twenty-four film pictures within one second as sixty fields, it would be necessary to accelerate the film about two and a half times faster than is required for regular motion-picture reproduction. Also, one will preferably use a high-resolution but slow photographic layer 13 on disk 11. It was found advantageous to slow down the recording of twenty-four film pictures to sixteen seconds. Accordingly, the turntable 10 is being rotated during recording sixteen times slower than the disk will be rotated for play back.

Figure 2:
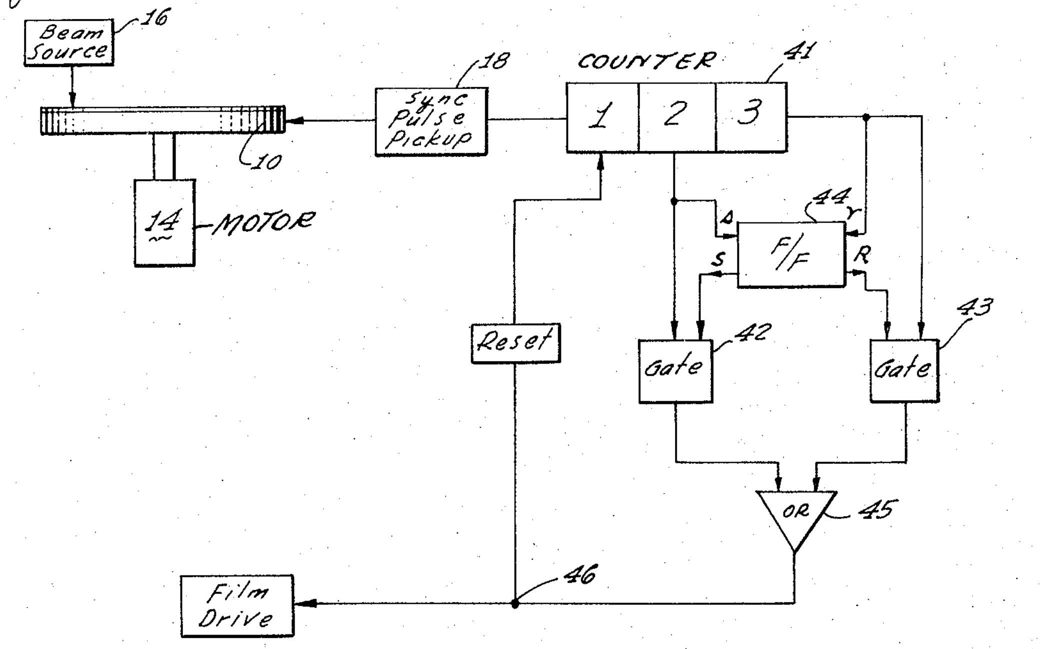
FIG. 2 illustrates a modification of the network shown in FIG. 1.

In the embodiment shown in FIG. 1, two counters have been employed for distinguishing between successive numbers of fields per scanned film picture. FIG. 2 illustrates a modification of the network shown in FIG. 1, showing that one counter may suffice. Several elements shown in FIG. 1 have been omitted in FIG. 2, and it is understood that the system shown in FIG. 2 is to be supplemented accordingly.

The detector 18, in FIG. 2, feeds its output sync pulses directly to a three-stage counter 41, there being no gate interposed in this connection. The second stage of counter 41 has an output connected to the input terminal of gate 42, while the third stage of counter 41 has its output connected to the input terminal of gate 43. The second and the third stages of counter 41 also feed their respective output signals to the two input terminals of a flip-flop 44 having its two output terminals connected to the gating terminals of gates 42 and 43, respectively. The connection is made so that an output pulse derived from the third stage of counter 41 places flip-flop 44 into a state blocking gate 43 but gating-open gate 42. Conversely, an output pulse from the second stage of counter 41 places flip-flop 44 into a state wherein gate 42 is blocked, while gate 43 is gated-open. A slight delay may be interposed in the input or the output circuitry of flip-flop 44 so that the output pulse of the second stage may pass through gate 42 before this gate is blocked, and the output pulse of the third stage should pass through gate 43 before this gate is blocked.

Such a delay can simply be provided by means of unidirectional differentiation in that the leading edge of each counter-stage output pulse is used for passage through the respective gate, while the trailing edge of the same pulse is used for triggering the flip-flop 44. The output terminals of the two gates 42 and 43 are connected to two input terminals respectively of an OR gate 45 having an output terminal 46. The output pulse of OR gate 45 at terminal 46 is used for resetting counter 41 as well as for advancing the film drive in a manner described with reference to FIG. 1.

It will be appreciated that at terminal 46 there will appear an output pulse alternatingly after two and after three sync pulses, as produced by and in detector 18.

In the two embodiments of the invention described above, the entire device is controlled by a train of sync pulses produced by interaction of reference marker 15 on turntable 10 and of detector 18. In other words, the speed of the turntable is used to control the entire recording and video signal transfer system and the time sequence of the transfer operation.

Figures 3, 4:
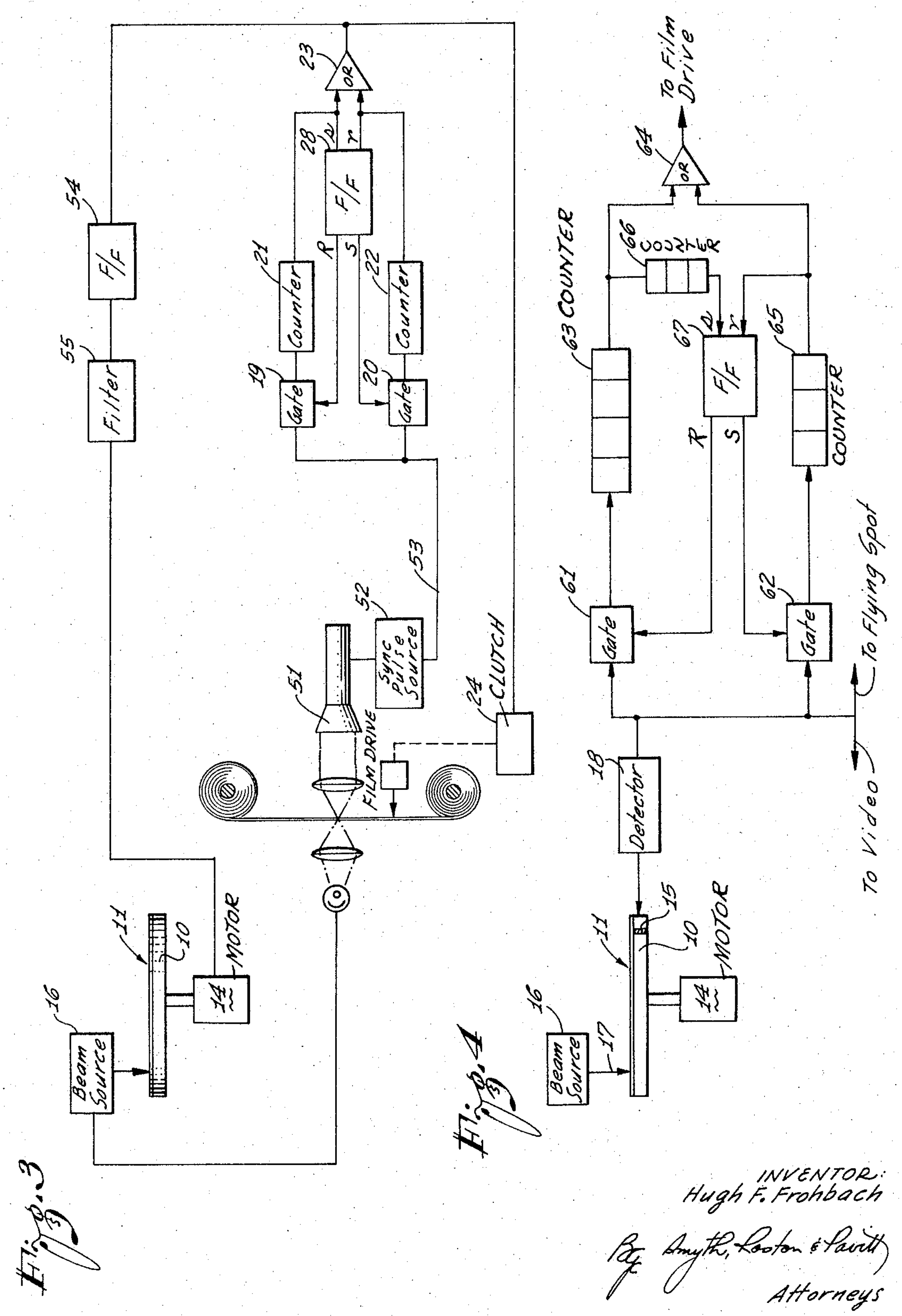
FIG. 3 illustrates schematically a block diagram of another embodiment of the present invention.
FIG. 4 illustrates a modification of either FIG. 1 or FIG. 3.

In FIG. 3, there is now shown a device and system wherein the means controlling the flying spot produced in a cathode-ray tube 51 also controls the recording and video information transfer process.

There is provided a network 52 producing together with cathode-ray tube 51 a flying spot running through interlaced scanning fields, and at the beginning of each scanning field there is produced an output sync pulse in line 53. Line 53 connects to the signal input sides of two gates 19 and 20, which gates have their respective output sides connected to the two counters 21 and 22, respectively; the flip-flop 28 alternatingly causes the input lines of the two counters to be opened and blocked by means of the two gates 19 and 20. The OR gate 23 combines the two counter outputs; and in a manner similar to the mode of operation described above, there will be an output pulse at OR gate 23 occurring alternatingly after two and after three successive sync pulses passing through connection line 53.

The output pulse of OR gate 23 controls the film drive, through a clutch 24, also as described above. Additionally, this output pulse of OR gate 23 is fed to a flip-flop 54 having only one input terminal and serving as a voltage block generator. The flip-flop output voltage is fed to a filter network 55 so that a substantially sinusoidal wave appears at the output side thereof. The frequency of this A.C. voltage is identical with or is one-half of the frequency of the sync-pulse source 52, and this A.C. voltage is used to drive motor 14 for turntable 10. Elements 54 and 55 may be substituted by any slave-type oscillator.

The recording process follows the rule outlined above, but there is no reference marker to be observed at turntable 10.

Motor 14 may additionally be subjected to a fine speed control, as outlined, for example, in copending application of Johnson et al., Ser. No. 192,930, filed May 7, 1962.

The above-described embodiments are designed specifically to convert a film picture rate of twenty-four pictures per second into a video frame rate for television reproduction of thirty frames per second. The inventive method, however, is susceptible to adaptation to other film picture rates. This is of particular importance, since older movies or small-camera type movies have been or are being taken at a rate of sixteen pictures per second. The network shown in FIG. 4 permits the following mode of video transfer and recording.

Reference is made to above formulas. For the present example, there is $n=15$ and $m=4$. Since $$\frac{n}{m}=3.75$$

with $0.75>0.5$, one will use $x=1$. Accordingly, $$p=\frac{n+1}{m}-1=3$$

and $$p+1=\frac{n+1}{m}=4$$

This result can be interpreted as follows. A first film picture will be reproduced in four fields or in two similar frames for video recording; also, for the next and the next following pictures, there will be four fields each. Thereafter the fourth film picture within the cycle presently considered is reproduced in only three fields. Thus, the particular recording cycle distributes four film pictures over fifteen interlaced fields.

In order to carry out the aforedescribed objective, there is again provided a detector 18, scanning and observing passage of the reference marker 15 on rotating turntable 10. The output of detector 18 is applied to the input terminals of gates 61 and 62. The output of gate 61 is fed as a counting signal to a four-stage counter 63, the output of which feeds one input terminal of an OR gate 64 serving a pulse adder.

The output terminal of gate 62 connects to the counting signal input terminal of a three-stage counter 65 having its output terminal connected to a second input terminal of OR gate 64.

The mutual blocking of the two counters is carried out by the following network: The count-four output terminal of counter 63 is connected to a three-stage counter 66 receiving as counting signals the output signal of counter 63. Hence counters 63 and 66 are cascaded. The output of counter 66 receives a signal after twelve sync pulses have been permitted to pass through gate 61 into counter 63. This output signal of counter 66 triggers a flip-flop 67 having one output terminal connected to the gating terminal of gate 61 for blocking this gate whenever counter 66 produces an output signal. A second connection from flip-flop 67 leads to the gating terminal of gate 62 so that this gate 62 is opened simultaneously.

The output side of counter 65 connects directly to the other input terminal of flip-flop 67 so that after three sync pulses have been permitted to pass through gate 62, flip-flop 67 is placed in a state blocking gate 62 and opening gate 61.

The invention is not limited to the embodiments described above, but all changes and modifications thereof not constituting departures from the spirit and scope of the invention are intended to be covered by the following claims.

What is claimed is:

1. An apparatus for recording film pictures along a spiral track on a rotating information storage carrier with $m$ film pictures to be recorded in $n$ fields along such a track, the combination comprising:

first means for rotatably supporting a disk as carrier on which video information is to be recorded;

second means coupled to the first means for providing rotation to the first means and to the disk thereon;

third means coupled to the first means and providing a train of sync pulses in response to the progressing rotation of the disk;

first counting means connected to said sync-pulse producing means for counting $$\frac{n+1}{m}$$

sync pulses and producing a first output pulse after such $$\frac{n+1}{m}$$

counted sync pulses;

second counting means connected to said sync-pulse producing means for counting $$\frac{n+1}{m}-1$$

sync pulses and producing a second output pulse after such $$\frac{n+1}{m}-1$$

counted sync pulses;

film-scanning means connected to said sync pulse-producing means for producing a video field scanning signal, one field per sync pulse, of a film picture momentarily within its scanning range;

control means connected to said film-scanning means and to said two counting means so that said film-scanning means produces selectively $$\frac{n+1}{m}-1$$

and $$\frac{n+1}{m}$$

fields per film picture; and recording means coupled to the disk on the first means and connected to the film scanning means to record said video field scanning signal on the disk.

2. An apparatus for recording film pictures along a spiral track on a rotating information storage carrier with $m$ film pictures to be recorded in $n$ fields along such a track, the combination comprising:

first means for rotatably supporting a disk as carrier on which video information is to be recorded;

second means coupled to the first means for providing rotation to the first means and to the disk thereon;

third means coupled to the first means and providing a train of sync pulses in response to the progressing rotation of the disk;

first counting means connected to said pulse-producing means for counting $$\frac{n-1}{m}$$

sync pulses and producing a first output pulse after such $$\frac{n-1}{m}$$

sync pulses have been counted;

second counting means connected to said sync pulse-producing means for counting $$\frac{n-1}{m}+1$$

sync pulses and producing a second output pulse after such $$\frac{n-1}{m}+1$$

counted sync pulses;

film-scanning means connected to said sync pulse-producing means for producing a video field scanning signal, one field per sync pulse, of a film picture momentarily within its scanning range;

control means connected to said film-scanning means and to said first and second counting means so that said film-scanning means produces selectively $$\frac{n-1}{m}$$

and $$\frac{n-1}{m}+1$$

fields per film picture; and recording means coupled to the disk on the first means and connected to the film scanning means to record said video field scanning signal on the disk.

3. An apparatus for recording film pictures along a spiral track on a rotating information storage carrier with $m$ film pictures to be recorded in $n$ fields along such a track, the combination comprising:

first means for rotatably supporting a disk as carrier on which video information is to be recorded;

second means coupled to the first means for providing rotation to the first means and to the disk thereon;

third means coupled to the first means and providing a train of sync pulses in response to the progressing rotation of the disk;

first counting means connected to said sync pulse-producing means for counting $$\frac{n+1}{m}$$

sync pulses and producing a first output pulse after such $$\frac{n+1}{m}$$

counted sync pulses;

second counting means connected to said sync pulse-producing means for counting $$\frac{n+1}{m}-1$$

sync pulses and producing a second output pulse after such $$\frac{n+1}{m}-1$$

counted sync pulses;

film-scanning means connected to said sync pulse-producing means for producing a video field scanning signal, one field per sync pulse, of a film picture momentarily within its scanning range;

film-advancing means connected to said first and said second counting means for selectively advancing said film by one picture after $$\frac{n+1}{m}-1$$

and $$\frac{n+1}{m}$$

fields have been produced by said film-scanning means; and recording means coupled to the disk on the first means and connected to the film scanning means to record said video field scanning signal on the disk.

4. An apparatus for recording film pictures along a spiral track on a rotating information storage carrier with $m$ film pictures to be recorded in $n$ fields along such a track, the combination comprising:

first means for rotatably supporting a disk as carrier on which video information is to be recorded;

second means coupled to the first means for providing rotation to the first means and to the disk thereon;

third means coupled to the first means and providing a train of sync pulses in response to the progressing rotation of the disk;

first counting means connected to said pulse-producing means for counting $$\frac{n-1}{m}$$

sync pulses and producing a first output pulse after such $$\frac{n-1}{m}$$

sync pulses have been counted;

second counting means connected to said sync pulse-producing means for counting $$\frac{n-1}{m}+1$$

sync pulses and producing a second output pulse after such $$\frac{n-1}{m}+1$$

counted sync pulses;

film-scanning means connected to said sync pulse-producing means for producing a video field scanning signal, one field per sync pulse, of a film picture momentarily within its scanning range;

film-advancing means connected to said first and second counting means and respectively responsive to said first and second output pulses for selectively advancing said film by one picture after $$\frac{n-1}{m}$$

and $$\frac{n-1}{m}+1$$

fields have been produced therefrom; and recording means coupled to the disk on the first means and connected to the film scanning means to record said video field scanning signal on the disk.

5. An apparatus for recording film pictures on an information storage carrier with $m$ film pictures to be recorded in $n$ fields on a rotating disk capable of receiving characteristical information for storage along a track thereon, the combination comprising:

first means for rotatably supporting a disk as carrier on which video information is to be recorded;

second means coupled to the first means for providing rotation to the first means and to the disk thereon;

third means disposed for providing a train of sync pulses in response to the progressing rotation of the disk;

counting means connected to said sync pulse-producing means for counting two different numbers of sync pulses and producing first and second output pulses after having counted a selected number of sync pulses;

means connected to said counting means for selecting the number to be counted;

film-scanning means connected to said sync pulse-producing means for producing a video field scanning signal, one field per sync pulse, of a film picture momentarily within its scanning range;

recording means responsive to said video field signal for inscribing a spiral track containing characteristical information on said disk; and control means connected to said film-scanning means and to said counting means so that said film-scanning means produces selectively different numbers of fields per film picture.

6. An apparatus for recording film pictures on an information storage carrier with $m$ film pictures to be recorded in $n$ fields on a rotating disk capable of receiving characteristical information for storage along a track thereon, the combination comprising:

detector means for sensing the rotation of said disk and producing a train of sync pulses representative of said rotation;

counting means connected to said pulse-producing means for counting different numbers of sync pulses, one number at a time and at a cyclically varying rate of counting-number alternations, and producing individual output pulses after a selected number of sync pulses has been counted;

means connected to said sync pulse-producing means for selecting the number of sync pulses to be counted;

means connected to said pulse-producing means for producing a flying spot-scanning beam, running through one scanning field per sync pulse, there being a film picture within the scanning range of said beam;

film-advancing means connected to said counting means and respectively responsive to said output pulses for selectively advancing said film; and means responsive to said scanning beam as modulated by said film picture, and for recording a corresponding signal along a spiral track on said disk, said recording including a recording representing said sync pulses.

7. An apparatus for recording film pictures on an information storage carrier with $m$ film pictures to be recorded in $n$ fields on a rotating disk capable of receiving characteristical information for storage along a track thereon, the combination comprising:

detector means for sensing the rotation of said disk and producing a train of sync pulses representative of said rotation;

film-scanning means connected to said detector means for producing a video field scanning signal, in synchronism with said sync pulses, of a film picture momentarily within its scanning range;

first counting means connected to said detector means for counting a first number of sync pulses and producing a first output pulse after counting said first number of sync pulses;

second counting means connected to said detector means for counting a second number of sync pulses and producing a second output pulse after counting said second number of sync pulses;

control means connected to said film-scanning means and to said first and second counting means so that said film-scanning means produces selectively different numbers of fields per film picture; and recording means connected to said film scanning means and being responsive to said video field scanning signal as modulated by said film picture for inscribing a recording thereof along a spiral track on said disk, said recording including one recorded sync pulse per disk revolution.

8. An apparatus for recording film pictures on an information storage carrier with $m$ film pictures to be recorded in $n$ fields on a rotating disk capable of receiving characteristical information for storage along a track thereon, the combination comprising:

detector means for sensing the rotation of said disk and producing a train of sync pulses representative of said rotation;

film-scanning means connected to said detector means for producing a video field scanning signal, one field signal per sync pulse, of a film picture momentarily within its scanning range;

film-advancing means connected to said detector means for selectively advancing said film by one picture after a selected number of fields have been produced by said film-scanning means; and recording means connected to said film scanning means and being responsive to said video field scanning signal as modulated by said film picture for inscribing a recording thereof along a spiral track on said disk.

9. An apparatus for recording film pictures on an information storage carrier with $m$ film pictures to be recorded in $n$ fields on a rotating disk capable of receiving characteristical information for storage along a track thereon, the combination comprising:

detector means for sensing the rotation of said disk and producing a train of sync pulses representative of said rotation;

counting means connected to said detector means for counting selected numbers of sync pulses and producing an output pulse after a selected number of sync pulses has been counted;

means connected to said detector means for selecting the number of sync pulses to be counted;

film-scanning means connected to said detector means for producing a video field scanning signal, one field signal per sync pulse, of a film picture momentarily within its scanning range;

film-advancing means connected to said first and second counting means and respectively responsive to said output pulses for selectively advancing said film by one picture after a selected number of fields has been produced therefrom; and recording means connected to said film scanning means and being responsive to said video field scanning signal as modulated by said film picture for inscribing a recording thereof along a spiral track on said disk.

10. An apparatus for recording film pictures on an information storage carrier with $m$ film pictures to be recorded in $n$ fields on a rotating disk capable of receiving characteristical information for storage along a track thereon, the combination comprising:

first means for rotatably supporting a disk as carrier on which video information is to be recorded;

second means coupled to the first means for providing rotation to the first means and to the disk thereon;

third means disposed for providing a train of sync pulses in response to the progressing rotation of the disk;

recording means for inscribing a spiral track containing characteristical information on said disk;

first counting means for counting a first number of sync pulses and producing a first output pulse after counting said first number of sync pulses;

second counting means for counting a second number of sync pulses and producing a second output pulse after counting said second number of sync pulses;

means for mutually blocking said counting means, so that only one counter at a time is permitted to count;

means connected to said pulse-producing means for producing a flying spot-scanning beam, running through one scanning field per sync pulse, there being a film picture within the scanning range of said beam;

film-advancing means connected to said first and said second counting means for selectively advancing said film by one picture after said first and said second number of fields have been produced by said film-scanning means; and means responsive to said scanning beam as modulated by said film picture, and for recording a corresponding signal along a spiral track on said disk.

11. An apparatus for recording film pictures on an information storage carrier with $m$ film pictures to be recorded in $n$ fields on a rotating disk capable of receiving characteristical information for storage along a track thereon, the combination comprising:

first means for rotatably supporting a disk as carrier on which video information is to be recorded;
second means coupled to the first means for providing rotation to the first means and to the disk thereon;
third means disposed for providing a train of sync pulses in response to the progressing rotation of the disk;
counting means connected to said pulse-producing means for counting different numbers of sync pulses, one number at a time and at a cyclically varying rate of counting-number alternations, and producing individual output pulses after a selected number of sync pulses has been counted;
means connected to said pulse-producing means for selecting the number of sync pulses to be counted;
means connected to said pulse-producing means for producing a flying spot-scanning beam, running through one scanning field per sync pulse, there being a film picture within the scanning range of said beam;
film-advancing means connected to said counting means and respectively responsive to said output pulses for selectively advancing said film; and
means responsive to said scanning beam as modulated by said film picture, and for recording a corresponding signal along a spiral track on said disk.

12. An apparatus for recording film pictures along a spiral track on a rotating information storage carrier with any number of film pictures to be recorded in a different number of fields, along such a track, the combination comprising:
first means for rotatably supporting a disk as carrier on which video information is to be recorded;
second means coupled to the first means for providing rotation to the first means and to the disk thereon;
third means disposed for providing a train of sync pulses in response to the progressing rotation of the disk;
film-advancing means for placing the picture on a film into successive positions for scanning;
means producing interlaced scanning fields for scanning the film picture placed by said advancing means into scanning position, said scanning means connected to be operated in synchronism with said sync pulses;

control means interconnecting said pulse-producing means and said film-advancing means for advancing said film at a cyclically varying rate of sync-pulse occurrences; and
recording means coupled to the disk on the first means and connected to the film scanning signal on the disk.

13. An apparatus for recording film pictures along a spiral track on a rotating information storage carrier with any number of film pictures to be recorded in a different number of fields along such a track, the combination comprising:
first means for rotatably supporting a disk as carrier on which video information is to be recorded;
second means coupled to the first means for providing rotation to the first means and to the disk thereon;
third means coupled to the first means and providing a train of sync pulses in response to the progressing rotation of the disk;
counting means for counting two different numbers of sync pulses, one number at a time, at a cyclically varying rate of counting-number alternations, and individual output signals after counting;
film-scanning means connected to said sync pulse-producing means for producing a video field scanning signal, one field per sync pulse, of a film picture momentarily within its scanning range;
film-advancing means connected to said counting means and respectively responsive to said output pulses for selectively advancing said film by one picture; and
recording means coupled to the disk on the first means and connected to the film scanning signal on the disk.

References Cited

UNITED STATES PATENTS

| | | | |
|---|---|---|---|
| 2,422,398 | 6/1947 | Dilks | 179—100.3 |
| 2,720,554 | 10/1955 | Harshbarger | 178—7.2 |
| 2,735,333 | 2/1956 | Mitchell | 178—7.2 |
| 3,179,870 | 4/1965 | Maxey | 178—6.6 |

JOHN W. CALDWELL, *Primary Examiner.*

H. W. BRITTON, *Assistant Examiner.*

UNITED STATES PATENT AND TRADEMARK OFFICE

CERTIFICATE OF CORRECTION

PATENT NO. : 3,366,733

DATED : January 30, 1968

INVENTOR(S) : Hugh F. Frohbach

It is certified that error appears in the above-identified patent and that said Letters Patent are hereby corrected as shown below:

Column 14, line 19, cancel "an";
same line, "pulse" should read --pulses--;
lines 27 and 28, cancel "first and second".

Column 15, line 37, "picture" should read --pictures--;
line 41, after "said" insert --film--;
line 42, after "pulses" insert --to produce a video field scanning signal--.

Column 16, line 6, after "scanning" insert --means to record said video field scanning--;
line 31, after "scanning" insert --means to record said video field scanning--.

Signed and Sealed this

*Twenty-eighth* Day of *November 1978*

[SEAL]

*Attest:*

RUTH C. MASON
*Attesting Officer*

DONALD W. BANNER
*Commissioner of Patents and Trademarks*